Figure 1:
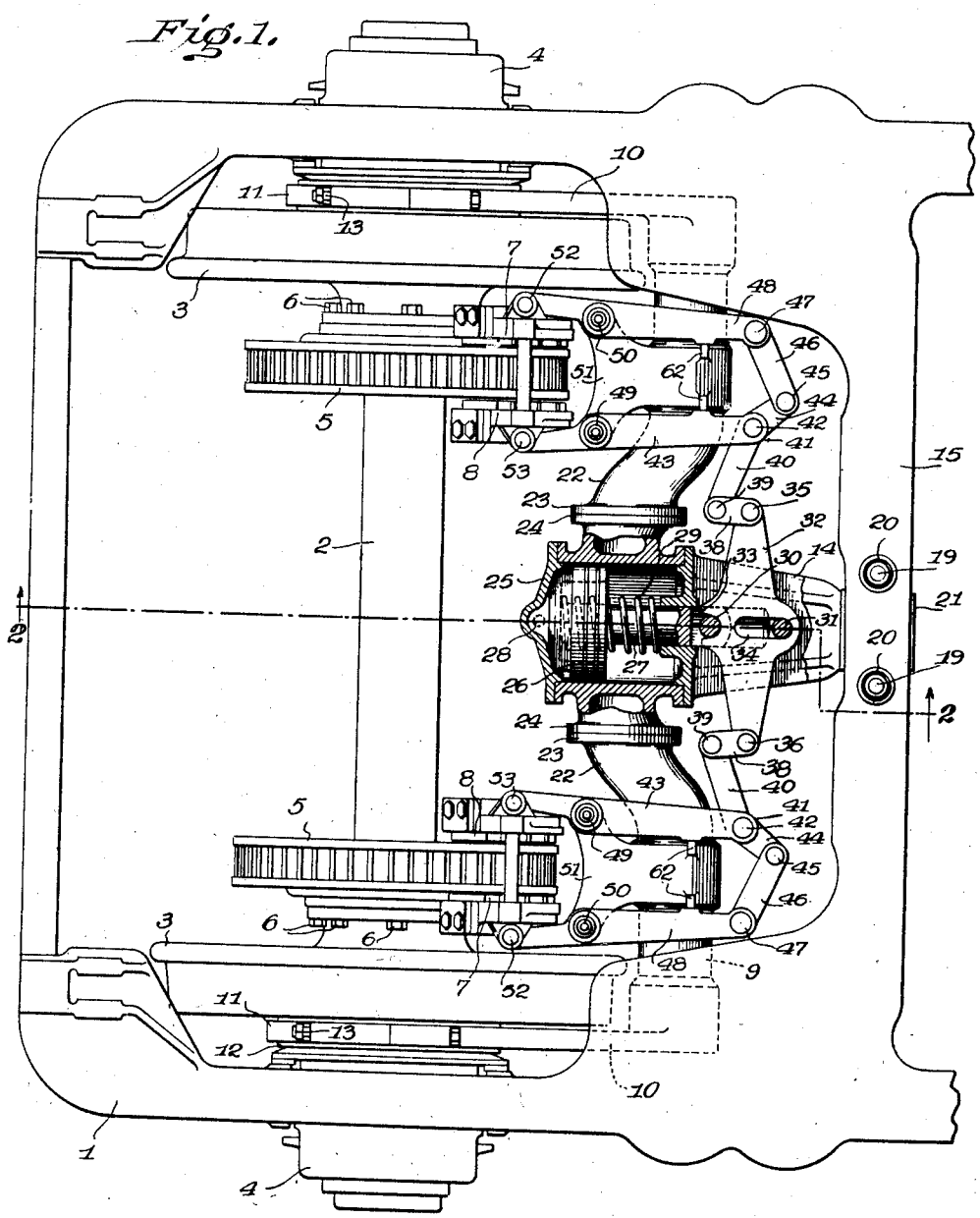

May 26, 1942.  C. L. EKSERGIAN ET AL  2,284,605
BRAKE MECHANISM
Filed July 10, 1940   2 Sheets-Sheet 1

Inventors
Carolus L. Eksergian and
Paul W. Gaenssle
BY John P. Barbry
Attorney

Inventors
Carolus L. Eksergian and
Paul W. Gaenssle
BY John P. Tairox
Attorney

Patented May 26, 1942

2,284,605

UNITED STATES PATENT OFFICE 2,284,605

BRAKE MECHANISM

Carolus L. Eksergian and Paul W. Gaenssle, Detroit, Mich., assignors to Budd Wheel Company, Philadelphia, Pa., a corporation of Pennsylvania Application July 10, 1940, Serial No. 344,650

9 Claims. (Cl. 188—153)

The present invention relates to a brake system, particularly adapted for use with brakes of the type disclosed in copending application Serial Number 270,750, filed April 29, 1939, now Patent 2,236,898, April 1, 1941.

In brakes of this kind, it is desirable to provide an operating mechanism which is as compact as possible, since it must usually be installed in a very limited space, and the present invention therefore has as one of its objects to so arrange the various elements of the brake that it will be extremely compact.

This object is accomplished by making certain elements serve two functions, specifically by combining the cross member of the brake with the brake cylinder or cylinders, that is, by forming a number of brake cylinders directly in the said cross member, whereby not only is the horizontal extent of the brake mechanism materially shortened, but the weight is also reduced, which is itself a very desirable feature. It will be understood that the term "number" is here used in its ordinary mathematical sense, to include unity as well as plural numbers.

Other objects and advantages of the invention in part will be specifically pointed out in the present specification, and in part will be self evident.

Figure 2:
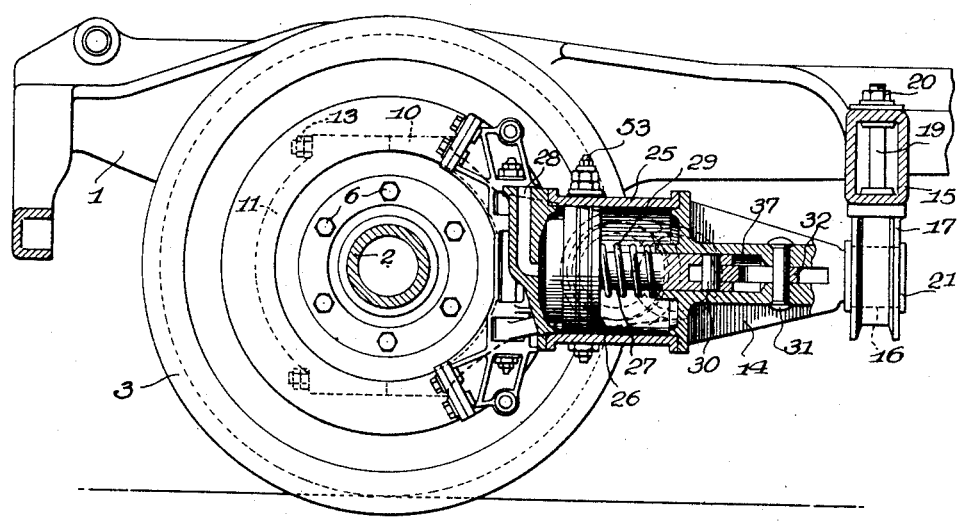
Figure 3:
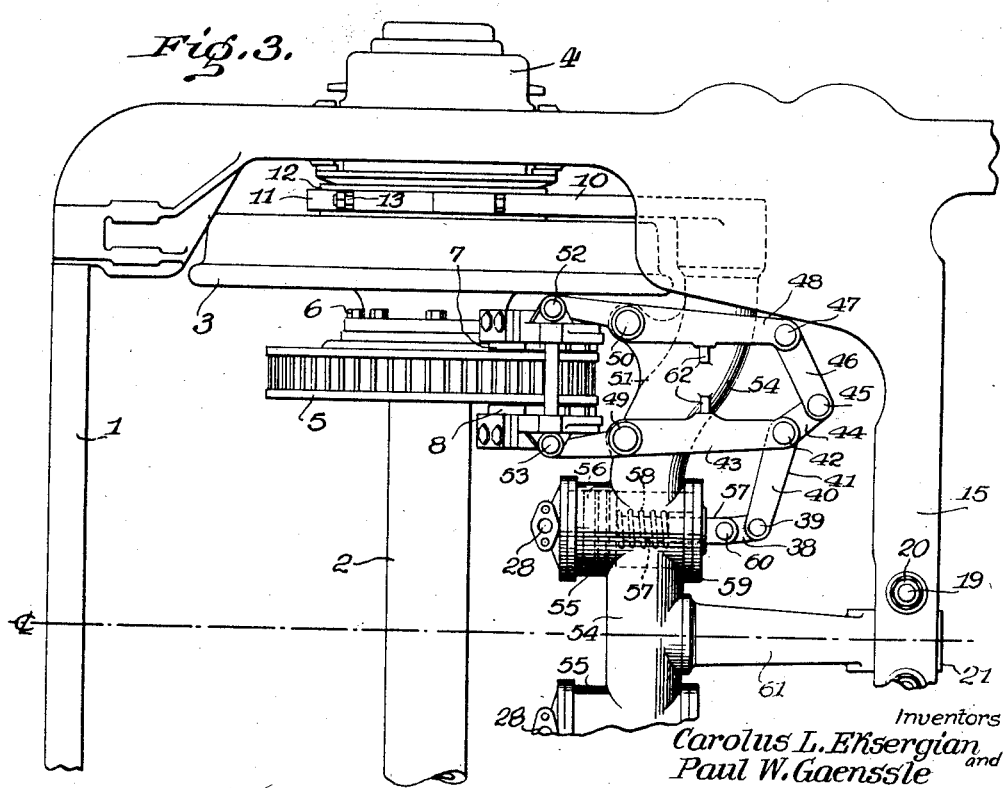

In the drawings accompanying the same, and forming a part thereof,

Fig. 1 is a diagrammatic plan view of a truck partly broken away with the invention applied thereto, the single brake cylinder and a few associated parts being shown in section;

Fig. 2 is a diagrammatic longitudinal section through the structure illustrated in Fig. 1, on the planes indicated by the broken line 2—2 thereof; and Fig. 3 is a fragmentary diagrammatic plan view of a truck similar in general to that shown in Figs. 1 and 2, but embodying a modified form of the invention, having two separate brake cylinders in place of the single one of Figs. 1 and 2.

Referring first to Figs. 1 and 2, the truck 1 has the pedestals or journal boxes 4, wherein are journaled the ends of the axle 2. The axle carries the wheels 3 and the brake discs 5, which may be secured thereto by the bolts 6, and which cooperate with the lateral brake shoes 7 and 8, in the manner disclosed in the aforesaid copending application.

A cross member 9, forming part of the brake mechanism, is carried from its ends by arms 10 which are mounted on the journal boxes 4, by means of straps 11, which fit about cylindrical portions 12 of said boxes, the corresponding ends of the arms 10 being properly shaped to fit thereon, and the straps being secured to the arms by the bolts 13, so that thus the whole brake supporting frame can pivot about the axis of the axle 2.

Such pivotal motion is however limited to a very slight range, by reason of the rearwardly extending arm 14 carried by the cross member 9, which engages in an aperture 16 formed in a retainer 17, supported from the cross beam 15 of the truck 1 in any suitable way, as by the bolts 19 and nuts 20. Suitable shock absorbing material 21 may surround the end of the arm 14, within the retainer 17, so that thus while the arm 14 may move slightly in either a vertical or a lateral sense, to compensate for lack of alinement or sudden jars, it will nevertheless be maintained substantially in one position. This feature is disclosed in detail, and claimed, in the copending case and therefore need not be described more fully here.

The cross member 9 has offsetting bends 22 disposed therein, so as to bring the central portion of the member 9 closer to the axle 2. Flanges 23 are preferably provided at the ends of these offset parts, to cooperate with corresponding flanges 24 carried by the brake cylinder 25, so that when each flange 23 is secured to its adjacent flange 24, as by welding or the like, a rigid cross member will thus be produced, having a brake cylinder at its central part, the axis of the said cylinder preferably extending at right angles to the length of the cross member 9, and pointing toward the axis of the axle.

In this way the cylinder 25 is brought very close to the axle 2, so that space is economized. A piston 26 mounted on the rod 27 moves within the cylinder in response to fluid pressure applied in any suitable way, as through the compressed air supply pipe 28. A suitable helical spring 29 will return the piston to the end of the cylinder when the pressure is removed.

An equalizing lever or yoke 32 is arranged as shown, to be actuated by the piston rod 27, through the pin 30 bearing in the notch 33 of the lever, said lever also having a slot 34 which loosely surrounds the pin 31, so that a sufficient extent of pivotal motion is made possible to enable the lever 32 to assume the correct position to equalize the braking efforts exerted at its ends 35 and 36. The rearwardly extending arm 14 has a bore 37 therein to guide the rod 27 and the pin 30 for this purpose, the lever 32 being supported and guided by a transverse slot in the arm 14 and by the fixed vertical pin 31.

Links 38 are pivotally attached to the ends 35 and 36 of the lever 32 and are pivoted at their other ends to the ends 39 of the long arms 40 of bell crank levers 41, each pivoted at 42 to the end of the long arm of a corresponding lever 43.

The short arm 44 of each lever 41 is pivoted at 45 to one end of a link 46 whose other end is pivoted at 47 to the end of the long arm of a lever 48.

The levers 43 and 48 are pivotally supported at 49 and 50, respectively, on correspondingly located brackets 51 secured to the cross member 9 or forming integral parts thereof if preferred, so that when the long arms of the said levers move apart, their short arms will approach each other, and since the brake shoes 7 and 8 are pivoted at 52 and 53 to the said short arms, it will be clear that such separation of the long arms will result in forcing the brake shoes against the brake discs. Bumpers or stops 62 may be provided for the levers, as shown.

Each pair of levers 43 and 48 has its long ends connected by a toggle formed of link 46 and lever arm 44, and moreover the system of levers is free to adjust itself laterally as a unit, by reason of the free link 38, hence not only will the forces applied by the ends of the yoke 32 be increased by the toggle action, but also the brake shoes 7 and 8 of each set will automatically adjust themselves to the positions of equal braking force, so that by virtue of the system described all four brake shoes are automatically equalized, and all are operated from a single air cylinder.

Referring now to the form disclosed in Fig. 3, most of the structure is identical with that of the preceding form, and is therefore indicated by the same reference characters.

The cross member 54, which here takes the place of member 9 of Fig. 1, differs from the latter in having two air cylinders incorporated therein in place of the single one of the other form. It will be understood that only one longitudinal half of the structure is shown in Fig. 3, since it is symmetrical above and below the "center line" indicated, all the parts being duplicated.

The two identical air cylinders 55 are built into the cross member 54, and located on opposite sides of its center point. Each of these cylinders is approximately the same in structure as the single cylinder 25 of the other embodiment, but since each cylinder here actuates only a single pair of brakes, the cylinders 55 need not be as powerful as cylinder 25. Each cylinder 55 contains a piston 56 attached to a piston rod 57, and surrounded by a return spring 58, which bears against the piston 56 and the cylinder head 59, the latter serving also to guide the piston rod 57, which is attached pivotally at 60 to one end of link 38, which is identical with the link 38 of Fig. 1 and performs the same function of transmitting the braking force to the long arm 40 of the bell crank lever 41.

From here on, the structure and operation of the device is exactly the same as that of Fig. 1, and this is indicated by the identical numbering of the corresponding elements. The link 38 is here turned forward instead of backward, but this in no way changes its structure or purpose, namely, to permit the bell crank lever 41 and associated mechanism to shift laterally to the equalizing position.

The arm 61 extending rearwardly from the cross member 54, is housed at its end in the retainer 17, and is surrounded, as before, with yieldable material 21 to permit it to adjust its position slightly, to avoid twisting or other strains, resulting from shocks or lack of alinement.

The operation of both embodiments will be clear from the structure. Briefly summarized, when fluid pressure, such as air pressure, is supplied to the single cylinder 25, or the two cylinders 55, as the case may be, the piston rod or rods will force the brake shoes against the respective brake discs, through the toggles and the equalizing linkages, so that correctly equalized braking efforts are exerted throughout.

The brake cylinder or cylinders interposed in the cross member and forming a part thereof take up much less of the valuable space by virtue of such location thereof, and at the same time take the place of some of the metal which would otherwise be required as part of the cross member itself, thus resulting in economy of metal, and, what is of still more importance, economy of weight, since it is very desirable to attain lightness wherever it can be done without sacrifice of strength.

It is obvious that while two embodiments of the invention have been specifically described by way of illustration, it is not at all important that these should be considered to circumscribe the scope of the invention in any way, since many of the details may be altered without departing from the inventive concept. For example, while the two embodiments disclose one and two-cylinder types, it is possible to increase the number of cylinders still more, if preferred, nor are there necessarily exactly two brake discs, since more or less may be provided, as desired in any specific case.

The scope of the present invention should therefore be determined solely from the following claims.

This application covers the same subject matter as co-pending application Serial Number 285,269, filed in the name of C. L. Eksergian, which latter has been allowed to become abandoned, December 10, 1940.

What is claimed is:

1. In a brake mechanism, a truck, an axle carried thereby, and a wheel mounted on the axle, a brake disc rotating with the wheel, two brake shoes, one operatively associated with each face of said disc, a transverse support pivoted about the axis of the axle, means carried by the truck for preventing movement of the said support about its pivot, a fluid-pressure actuated device comprising a cylinder forming a stress-carrying structural part of said support, and having a piston therein, and means operatively connecting said piston to both said brake shoes, whereby the said shoes will be forced against the respective faces of the disc when fluid under pressure is supplied to the cylinder.

2. In a brake mechanism, a truck frame, an axle carried thereby, and a wheel mounted on the axle, a brake disc rotating with the wheel, a brake shoe operatively associated with said disc, a transverse support independent of the truck frame pivoted about the axis of the axle, means carried by the truck frame for preventing movement of the said support about its pivot, a fluid-pressure actuated device comprising a cylinder with the axis of its bore at right angles to the above-named axis, said cylinder forming a part of said support, and having a piston therein, and means operatively connecting said piston to said brake shoe, whereby the said shoe will be forced against the disc when fluid under pressure is supplied to the cylinder.

3. In a brake mechanism, a truck, an axle carried thereby, and a wheel mounted on the axle, a brake disc rotating with the wheel, two brake shoes, one operatively associated with each face of said disc, a transverse support pivoted about the axis of the axle, means carried by the truck for preventing movement of the said support about its pivot, a fluid-pressure actuated device comprising a cylinder having a bore whose axis extends at an angle to the axis of the axle, said cylinder forming a part of said support, and having a piston therein, and means operatively connecting said piston to both said brake shoes, whereby the said shoes will be forced against the respective faces of the disc when fluid under pressure is supplied to the cylinder.

4. In a brake mechanism, a truck, an axle carried thereby, and wheels mounted on the axle, two brake discs rotating with the wheels, a brake shoe operatively associated with each disc, a transverse support about the axis of the axle, means carried by the truck for preventing movement of the said support about its pivot, a fluid-pressure actuated device comprising a cylinder forming a stress-carrying structural part of said support, and having a piston therein, and means operatively connecting said piston to said brake shoes, whereby the said shoes will be forced against the respective discs when fluid under pressure is supplied to the cylinder.

5. In a brake mechanism, a truck, an axle carried thereby, and wheels mounted on the axle, two brake discs rotating with the wheels, two pairs of brake shoes, one shoe operatively associated with each face of each disc, a transverse support pivoted about the axis of the axle, means carried by the truck for preventing movement of the said support about its pivot, a fluid-pressure actuated device comprising a cylinder forming a part of said support, and having a piston therein, and means operatively conecting said piston to both pairs of said brake shoes, whereby all the said shoes will be forced against the respective faces of the respective discs when fluid under pressure is supplied to the cylinder.

6. In a brake mechanism, a truck, an axle carried thereby, and wheels mounted on the axle, two brake discs rotating with the wheels, two pairs of brake shoes, one shoe operatively associated with each face of each disc, a transverse support pivoted about the axis of the axle, means carried by the truck for preventing movement of the said support about its pivot, a fluid-pressure actuated device comprising a cylinder forming a part of said support, and having a piston therein, and means including equalizing devices, operatively connecting said piston to both pairs of said brake shoes, whereby all the said shoes will be forced equally hard against the respective faces of the respective discs when fluid under pressure is supplied to the cylinder.

7. In a brake mechanism, a truck, an axle carried thereby, and wheels mounted on the axle, two brake discs rotating with the wheels, two pairs of brake shoes, one shoe operatively associated with each face of each disc, a transverse support pivoted about the axis of the axle, means carried by the truck for preventing movement of the said support about its pivot, a fluid-pressure actuated device comprising a cylinder forming a part of said support, and having a piston therein, and means including equalizing devices, operatively connecting said piston to both pairs of said brake shoes, whereby all the said shoes will be forced equally hard against the respective faces of the respective discs when fluid under pressure is supplied to the cylinder, said equalizing devices including an equal-armed lever directly connected to the said piston.

8. In a brake mechanism, a truck, an axle carried thereby, and wheels mounted on the axle, a number of brake discs rotating with the wheels, a brake shoe operatively associated with each said disc, a transverse support pivoted about the axis of the axle, means carried by the truck for preventing movement of the said support about its pivot, a number of fluid-pressure actuated devices, each comprising a cylinder, said cylinders forming parts of said support, and each having a piston therein, said pistons being movable in a direction at an angle to the axis of the axle, and means operatively connecting said pistons to said brake shoes, whereby the said shoes will be forced against the respective discs when fluid under pressure is supplied to the cylinders.

9. In a brake mechanism, a truck, an axle carried thereby, and a wheel mounted on the axle, a brake disc rotating with the wheel, a brake shoe operatively associated with a face of said disc, a transverse support pivoted about the axis of the axle, said support having its central portion closer to the axle than its ends, means carried by the truck for preventing movement of the said support about its pivot, a fluid-pressure actuated device comprising a cylinder whose bore extends at an angle to said axis, said cylinder forming a part of the said central portion of said support, and having a piston therein, and means operatively connecting said piston to said brake shoe, whereby the said shoe will be forced against the respective face of the disc when fluid under pressure is supplied to the cylinder.

CAROLUS L. EKSERGIAN.
PAUL W. GAENSSLE.